United States Patent [19]

Montgomery et al.

[11] 3,821,192

[45] June 28, 1974

[54] PROCESS FOR PREPARING AN IRON-SACCHARIDE COMPLEX

[75] Inventors: Kenneth O. Montgomery; Chandrakant R. Jhaveri, both of Seymour, Ind.

[73] Assignee: The Central Pharmacal Company, Seymour, Ind.

[22] Filed: Aug. 18, 1971

[21] Appl. No.: 172,865

[52] U.S. Cl............ 260/209 R, 260/209 D, 424/361
[51] Int. Cl.............................................. C07c 47/18
[58] Field of Search...................... 260/209 D, 209 R

[56] References Cited
UNITED STATES PATENTS

| | | | |
|---|---|---|---|
| 3,076,798 | 2/1963 | Mueller et al................. | 260/209 R |
| 3,086,009 | 4/1963 | Zuschek et al................. | 260/209 R |
| 3,100,202 | 8/1963 | Muller et al................... | 260/209 D |
| 3,252,863 | 5/1966 | Lindvall et al................. | 260/209 R |

Primary Examiner—Johnnie R. Brown
Attorney, Agent, or Firm—Woodard, Weikart, Emhardt & Naughton

[57] ABSTRACT

A process is disclosed for efficient preparation of a stable, soluble complex of iron with glucose, maltose, or dextrin which contains between 40 and 46 percent iron and which is suitable for oral use in treatment of iron deficiency anemia. A ferric compound and a saccharide compound are mixed with water and the pH adjusted to above 11. After reacting at 80°C., the complex is precipitated by the addition of methyl alcohol and the precipitate separated by centrifugation.

6 Claims, No Drawings

PROCESS FOR PREPARING AN IRON-SACCHARIDE COMPLEX

BACKGROUND OF THE INVENTION

1. Field of the Invention

This invention relates to a complex of iron with a saccharide compound, a method of preparing the complex and the use of the complex to cure iron deficiency anemia.

2. Description of the Prior Art

There are several patents relating to the use of polysaccharides or monosaccharides for complexing with iron for injection into muscles or veins for the treatment of iron deficiency anemia. Three such patents are:

3,076,798 to Mueller et al.
3,086,009 to Zuschek et al.
3,275,514 to Saltman et al.

None of these patents disclose a complex which has anywhere near 40 to 45 percent iron and in fact these patents suggest that a high percentage iron would cause the complex to be insoluble in water, or that a complex with a high percentage iron would be unstable, or that it would be unable to be absorbed by the body if taken orally.

The prior art procedures used in making saccharide and iron complexes have only been used to produce complexes which at best have about 30 percent iron, typically 20 percent. Thus, the cost of manufacturing the complexes based on the cost per gm. of iron will be much higher because much more of the complexed compound will have to be processed, packaged, shipped, stored and sold to deliver the same amount of iron. Furthermore, with only a small amount of iron complexed to the saccharide, the administration of iron requires a large dosage of the complex to provide a required iron. Also, the prior art procedures for making complexes often require dialysis techniques or the use of ion exchange resins to provide the quality needed for use in animals or humans.

SUMMARY OF THE INVENTION

The invention relates to a complex which has between 40 and 46 percent iron and to a method for efficient preparation of the compound. The invention also relates to the use of the complex in treating iron deficiency anemia.

The process of the invention is very efficient compared to the prior art processes because, among other reasons, it does not require dialysis techniques or ion exchange resins and it produces a stable compound which has a very high percentage of iron. It is important to produce a compound with a high percentage of iron to reduce the amount of material needed to be administered for a given dosage. The compound produced is effective in treating iron deficiency anemia and it does not have certain of the disadvantages of ferrous sulfate.

DESCRIPTION OF THE PREFERRED EMBODIMENT

A low molecular weight dextrin having a dextrose equivalent value above 66 is dissolved in water. Dextrose equivalent is defined as reducing sugars expressed as dextrose and calculated as a percentage of the dry substance. A water soluble ferric iron compound in an amount equivalent to 20 to 65 gms. of ferric iron per 100 gms. of dextrin used is dissolved in water and mixed with the dextrin solution. To the mixture an aqueous solution of alkali is gradually added until Ferric Hydroxide precipitation is complete but pH is still acidic (below pH7). The mixture is stirred for a short time and then more alkali is added to bring the pH to above 11, and the temperature is regulated during the additions not to exceed 95°C., it being preferred that the temperature not exceed 80°C.

The reaction mixture is then stirred to assure complete mixing and reaction, the stirring typically lasting around fifteen minutes. After mixing has occurred, the solution is heated to between 65° and 95°C., it being preferred that the temperature be 80°C., until a uniform solution of complex is formed as can be observed.

After cooling this mixture and without neutralizing it, a non-solvent for the mixture (such as methyl alcohol or any other lower alkanol) is added for the purpose of precipitating the saccharide-iron complex. When methanol is used as is preferred, there should be at least 37 percent methanol in the precipitating mixture in order to assure that most of the polysaccharide iron complex is precipitated. The precipitate is then separated, preferably by centrifugation at 13,000 g, and washed with a water soluble lower alkanol and reseparated from the wash liquor, again preferably by centrifugation. The precipitate is then dried and ground to produce the desired particle size.

Throughout the process, the containers and mixing equipment that are used are non-metallic, typically glass and plastic, because it has been found that metals can interfere with the reactions involved. With the procedure as outlined a complex will invariably be produced which has from 40 to 46 percent iron and which will form an aqueous solution which is stable at a pH within the ranges of 1 to 1.5±0.3 and 5.7±0.3 to 14.

SPECIFIC EXAMPLE OF PROCEDURE FOR MAKING COMPLEX 244.5 grams of corn syrup (Veltose 170, 43° Baume) which is 18.16 percent water and 81.84 percent low molecular weight dextrin with a 70 dextrose equivalent value was dissolved in 455.5 ml. of water to make a solution. To this solution 535 ml. of a 75 percent w/w aqueous solution of ferric chloride hexahydrate was added and mixed with constant stirring.

To this mixture a 40 percent aqueous solution of sodium hydroxide was added with mixing until ferric hydroxide precipitation was complete, the temperature being kept below 80°C. The pH of this solution was 3.5. The mixture was mixed thoroughly and then an additional amount of the sodium hydroxide solution was added until the pH reached 11.5, the temperature being kept below 80°C. This mixture was constantly stirred, for about fifteen minutes and then the mixture was heated to 80°C. until a uniform solution of complex was observed.

The mixture was then cooled to room temperature and methyl alcohol was added in an amount equal in volume to the amount of the mixture. This addition precipitated the complex and the mixture was then centrifuged at 25,000 rpm (subjected to 13,000 g.) to separate the precipitate. 800 ml. of 50 percent methanol was added to and mixed with the precipitate to wash it. This mixture was centrifuged as before. The precipitate was dried at 60°C., and then ground to produce a desired particle size.

The product contained 42 percent iron and 90 percent of the iron used in the process was recovered in the product. The product was soluble and formed an aqueous solution which was stable at a pH within the ranges of 1 to 1.6 and 5.7 to 14. When either glucose or maltose is substituted for the dextrin the same results are achieved; however, when fructose was substituted for the dextrin no satisfactory product was obtained. If the alkali is added all at once without stopping at an acidic pH after ferric hydroxide precipitation, yield and product quality is relatively poor although the complex will be produced.

USE OF THE COMPOUND IN MAMMALS: ANIMALS AND HUMANS

In testing a dextrin-iron complex made according to the procedure as described above, no toxicity was noted in 48 rats in any of the oral dosage levels tested. As much as 2,800 mg. iron/Kg. body weight was found to have no toxic manifestations in the eight rats tested at that concentration.

To determine effectiveness, young pigs were rendered anemic by repeated bleedings. Four pigs were used as a control, four were given 50 mg/day of iron by oral administration of ferrous sulfate, and five were given 50 mg/day of iron by oral administration of the dextrin-iron complex made according to the procedure described above. Blood analyses were made periodically to determine hemoglobin and packed red cell volume values. Some of these values are:

|  | 0 days | 6 days | 14 days |
|---|---|---|---|
| | Hemoglobin | | |
| Control | 7.9 | 8.5 | 8.6 |
| FeSO$_4$ | 8.3 | 11.8 | 13.4 |
| Iron-Dextrin | 8.5 | 11.1 | 12.5 |
| | Packed Red Cell Volume | | |
| Control | 31.5 | 32.0 | 34.3 |
| FeSO$_4$ | 31.5 | 41.7 | 44.2 |
| Iron-Dextrin | 32.6 | 41.2 | 42.4 |

At 14 days following the initiation of treatment, all of the animals in the treatment group were within the normal range of values for hemoglobin and PCV, but the untreated controls were all substantially under the normal range of values.

To determine effectiveness in humans a comparison of ferrous sulfate and the iron-dextrin complex were made using ferrous sulfate labelled with $^{55}$Fe and the iron-dextrin labelled with $^{59}$Fe. Ten subjects were used for the study, seven of whom had phlebotomies. The ten subjects were divided into two groups with one group having one subject who had not had a phlebotomy and the second group having two such individuals. The two groups were given both labelled medications at the initiation of the study followed by successive doses of ferrous sulfate and the iron-dextrin compound on alternate days with one group taking the iron-dextrin compound on the second day and the second group taking ferrous sulfate. This process was continued through the ninth day when all subjects had received five oral doses of each compound (100 mg. iron, 5uc per dose). No side effects were reported by any of the subjects involved.

Two weeks following the beginning of the test the average absorption ratio was 1.26 (+0.17,−0.29). The absorption ratio is defined as the ratio of the percent of iron from the iron-dextrin compound incorporated in the red cells to the percent of ferrous sulfate iron incorporated in the red blood cells. Three weeks following the beginning of the test the average absorption ratio was 0.99 (+0.17−0.29). Thus it appears that iron from the iron-dextrin compound is at least as absorbable as iron from ferrous sulfate.

All percentages listed in the claims and specification and not otherwise indicated relate to weight not volume. While we have described particular embodiments of our invention for the purpose of illustration, it should be understood that only the preferred embodiments have been shown.

The invention claimed is:

1. A process for the efficient preparation of a therapeutically useful complex of iron and dextrin, maltose, or glucose which comprises:
   a. mixing with water, a saccharide substance wherein said saccharide substance is a material selected from the group consisting of a low molecular weight dextrin having a dextrose equivalent of above 66, maltose, and glucose and a water soluble ferric iron compound in an amount equivalent to 20 to 65 parts ferric iron per 100 parts of the saccharide substance,
   b. adding an alkali to the mixture to bring the pH to between 11 and 14, maintaining the temperature below 95°C,
   c. stirring the alkaline mixture to assure complete mixing and reaction,
   d. heating the alkaline mixture to between 60° and 95° C until a uniform solution of complex is formed,
   e. adding to the alkaline mixture a non-solvent for the alkaline mixture to precipitate the saccharide-iron complex,
   f. separating the precipitate.

2. The process of claim 1 in which the alkali is added in two parts, the first part being added until the ferric hydroxide precipitation is complete but pH is still acidic (below pH7) and after mixing the second part being added until the pH is between 11 and 14.

3. The process of claim 1 in which the non-solvent is methyl alcohol.

4. The process of claim 1 in which the precipitate is washed and dried following its separation.

5. The process of claim 1 in which the precipitated complex is separated by using a centrifuge.

6. A complex of iron and a saccharide compound wherein said saccharide compound is a material selected from the group consisting of glucose, maltose, and low molecular weight dextrin, said complex being characterized by forming an aqueous solution which is stable at a pH within the ranges of 1 to 1.2 and 6.0 to 14 and by having an iron content of between 40 and 46 percent.

* * * * *